(12) United States Patent
Daya et al.

(10) Patent No.: US 10,445,386 B2
(45) Date of Patent: Oct. 15, 2019

(54) SEARCH RESULT REFINEMENT

(71) Applicant: Microsoft Technology Licensing, LLC, Redmond, WA (US)

(72) Inventors: Rahim Daya, San Francisco, CA (US); Zian Yu, San Jose, CA (US); Shan Zhou, San Jose, CA (US); Jordan Anthony Saints, Sunnyvale, CA (US); Timothy Patrick Jordt, San Francisco, CA (US); Gregory Alan Walloch, Santa Cruz, CA (US); Zachary Tyler Piepmeyer, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 136 days.

(21) Appl. No.: 15/253,667

(22) Filed: Aug. 31, 2016

(65) Prior Publication Data

US 2017/0109445 A1  Apr. 20, 2017

Related U.S. Application Data

(60) Provisional application No. 62/241,611, filed on Oct. 14, 2015.

(51) Int. Cl.
| | | |
|---|---|---|
| *G06F 17/30* | (2006.01) | |
| *G06F 16/9535* | (2019.01) | |
| *G06F 16/25* | (2019.01) | |
| *G06F 16/901* | (2019.01) | |

(52) U.S. Cl.
CPC ........ *G06F 16/9535* (2019.01); *G06F 16/252* (2019.01); *G06F 16/9024* (2019.01)

(58) Field of Classification Search
None
See application file for complete search history.

(56) References Cited

U.S. PATENT DOCUMENTS

| | | | |
|---|---|---|---|
| 8,262,532 B2 | 9/2012 | Aoiz Miguel et al. | |
| 8,433,705 B1 | 4/2013 | Dredze et al. | |
| 9,251,279 B2* | 2/2016 | Mihalik | G06F 17/30864 |
| 9,262,532 B2* | 2/2016 | Pueyo | G06F 17/30867 |
| 9,360,982 B2 | 6/2016 | Emanuel et al. | |
| 9,418,103 B2* | 8/2016 | Shapira | G06F 16/2425 |
| 9,519,716 B2* | 12/2016 | Athsani | G06Q 30/0256 |

(Continued)

OTHER PUBLICATIONS

"International Application Serial No. PCT/US2016/056881, International Search Report dated Dec. 21, 2016", 4 pgs.

(Continued)

*Primary Examiner* — Debbie M Le
(74) *Attorney, Agent, or Firm* — Schwegman Lundberg & Woessner, P.A.

(57) ABSTRACT

System and techniques for search result refinement are described herein. Search results and a search context may be obtained. A context dependent facet set may be added to a search result in the search results. A user interface of the context dependent facet set may be presented in conjunction with displaying the search results. A selection of a facet in the context dependent facet set may be received from a user. The search results being displayed may be filtered such that search results that meet a measurement of the facet are included in the displayed search results and the remaining search results are excluded from the display.

21 Claims, 6 Drawing Sheets

(56) References Cited

U.S. PATENT DOCUMENTS

| | | |
|---|---|---|
| 9,594,540 B1 | 3/2017 | Stasior et al. |
| 9,596,308 B2* | 3/2017 | Brezina ................ H04M 15/00 |
| 9,710,556 B2* | 7/2017 | Koperski .............. G06F 16/951 |
| 10,108,710 B2* | 10/2018 | Shum .................... G06F 16/951 |
| 2006/0294071 A1* | 12/2006 | Weare ............... G06F 17/30864 |
| 2009/0292674 A1* | 11/2009 | Dasdan ............... G06F 17/3064 |
| 2012/0203751 A1 | 8/2012 | Srivastava et al. |
| 2012/0265746 A1* | 10/2012 | Srivastava ........ G06F 17/30528 707/706 |
| 2012/0265779 A1 | 10/2012 | Hsu et al. |
| 2014/0129552 A1 | 5/2014 | Sinha et al. |
| 2015/0039597 A1 | 2/2015 | Raina et al. |
| 2015/0067502 A1 | 3/2015 | Yang et al. |
| 2015/0205828 A1 | 7/2015 | Manciero et al. |
| 2016/0026643 A1* | 1/2016 | Desai ................. G06F 17/3053 707/727 |
| 2016/0179933 A1 | 6/2016 | Dimassimo et al. |
| 2016/0210337 A1* | 7/2016 | Constandt ............. G06Q 10/10 |
| 2017/0109411 A1 | 4/2017 | Daya et al. |
| 2017/0109412 A1 | 4/2017 | Daya et al. |
| 2017/0242898 A1* | 8/2017 | Su ......................... G06F 16/951 |

OTHER PUBLICATIONS

"International Application Serial No. PCT/US2016/056881, Written Opinion dated Dec. 21, 2016", 12 pgs.

"Non Final Office Action Issued in U.S. Appl. No. 15/253,381", dated Jun. 14, 2018, 12 Pages.

"Non-Final Office Action Issued in U.S. Appl. No. 15/253,644", dated Aug. 7, 2018, 9 Page.

"Final Office Action Issued in U.S. Appl. No. 15/253,381", dated Mar. 3, 2019, 15 Pages.

"Notice of Allowance Issued in U.S. Appl. No. 15/253,644", dated May 21, 2019, 10 Pages.

* cited by examiner

SEARCH RESULT REFINEMENT

CLAIM OF PROPERTY

This patent application claims the benefit of priority, under 35 U.S.C. § 119, to U.S. Provisional Application Ser. No. 62/241,611, titled "PRIORITIZED SEARCH RESULTS" and filed on Oct. 14, 2015, the entirety of which is hereby incorporated by reference herein.

TECHNICAL FIELD

Embodiments described herein generally relate to search engines and more specifically to search results refinement.

BACKGROUND

Search engines generally provide a structured mechanism to enter a request for data and match that request to items in a data store. These data store items generally include multiple fields that include data or references to other data. The data request is often structured with respect to a known field configuration of the data in the data store. Thus, queries are formulated that, for example, request title fields that include all or part of an article title.

After receiving a query, the search engine generally parses the query to determine when and where to search the data store, creating a query plan. The search engine then executes the query plan collecting results. These results, once located, may be further manipulated according to other parameters of the query. These manipulations may include sorting the results, aggregating results to produce a number, etc. The final result, following manipulations, is then returned to an agent to, for example, display the search results to a user. In some examples, the user may subsequent requests of the search engine for an already completed search to manipulate the search results further.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
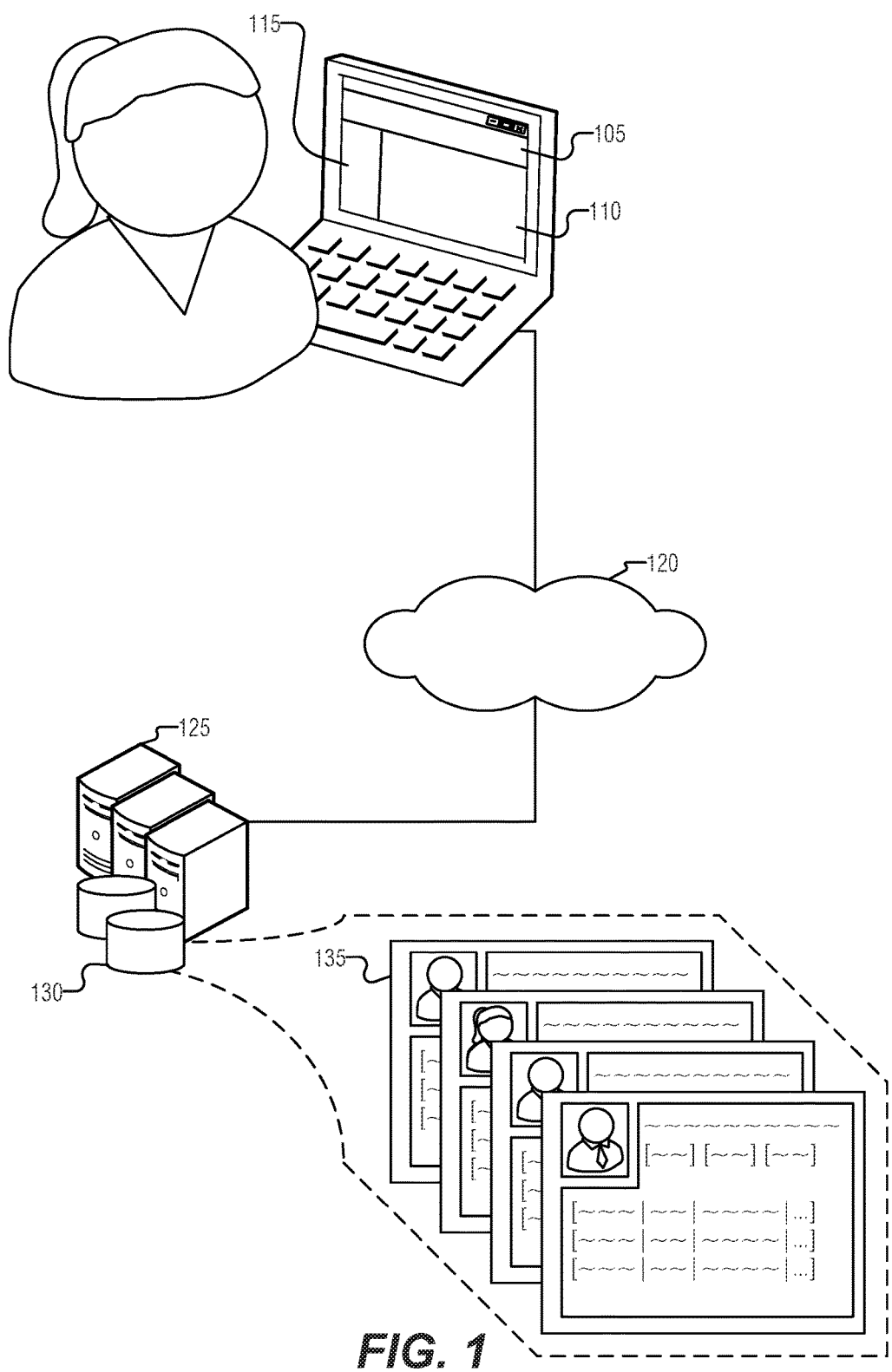
FIG. 1 illustrates an example of a system for search result refinement, according to an embodiment.

As noted above, searches may include both a query phase to produce search results and a post-query phase in which the returned results are manipulated. On example of this manipulation is in the interactive adding or subtracting of facets and filtering the search results based on a presently selected set of facets. Facets, also known as dimensions, are attributes of the records in the search result. Facets permit the focusing of the search result in a generally interactive manner without the expense or inconvenience of performing an additional search.

In some search tasks, a person will perform a task with each search result. An example used herein is that of searching for a candidate application by a recruiter. Another example may be, for example, a researcher looking for literature on a problem. In each of these examples, the user will likely spend significant time with each result finally identified. Although a good search and proper filtering with available facets may result in good search results, often there are still too many results to be dealt with effectively. To resolve this problem, a system of search result refinement is presented herein. This refinement includes a set of facets that are specific to the search task, rather than the data. As the data is acquired, such as in the form of search results, the search task facets are computed and added to the search results. Although effectively facets, the context specific nature of these refinements operates differently, adding data to the records that is of interest in one search, for example, but not necessarily relevant in another search. A separate user interface is presented to the user to select these context dependent facets and further refine the search results. Because this technique does not require changing the underlying data, it can be added to existing search systems. Further, by leveraging the context in which a search is being performed, the user experience a more intuitive search experience without additional work.

In an example where the user is a recruiter, these context dependent facets may be referred to as talent pools. Each talent pool may be calculated in the background (e.g., not in real-time with the search but rather beforehand) and derived from context features such as the user's identity (e.g., previous user searches, previous hires, previous candidate contacts, etc.), a search flow (e.g., guided search) available to the user, a company that may be searched (e.g., company connections by the candidate or user, company engagement by a candidate, past applicants to the company. etc.), as well as other aspects of records (e.g., candidate profiles) such as time in current position or competitive talent. In an example, batch-type machine learning mechanism (e.g., neural network, support vector machine, etc.) is used to determine the competitive talent values of top (e.g., ten best) competitors or top schools. Here, these values indicate what companies or schools a competing employer hire from. This is an example of a context dependent facet that may greatly improve the search manipulation provided to a recruiter. Additional details and examples are provided below.

FIG. 1 illustrates an example of a system 125 for facet expansion, according to an embodiment. The system 125, when in operation, is communicatively coupled to a network 120 and a data store 130. The network 120 permits the system 125 to communicate a user interface and receive user input from a user device, such as a laptop, tablet, smart phone, etc. As illustrated, the user interface is a search interface that includes atop rail 105, a side rail 115, and a results area 110. The data store 130 contains records 135, here illustrated as candidate records for possible employees. While the example of a recruiter searching for candidates is used throughout this document, other types of records and searches similar benefit from the systems and techniques discussed herein.

The components of the system 125 are implemented in computer hardware, such as with memory, storage (e.g., tape, platter-based hard drives, etc.), transceivers, search engines, query interfaces, filters, circuits, etc., that may be configured by software for a particular operation. As a convenience, the operations of the system 125 will be described with two components, a user interface module and a classifier.

The classifier is arranged to obtain(e.g., retrieve or receive) search results and to obtain a search context. The search context includes elements particular to the search, such as the user performing the search, an organization for which the search is being performed, a search work flow (e.g., a workflow in which the user is asked questions in a step-wise manner), etc. These elements may be relevant to the results, but are derived from the particulars of a search rather than attributes of the search results.

The classifier is arranged to add a context dependent facet set to a search result in the search results. The adding may include modifying a record of the search result but, in most cases, involves recording an association between a particular search result and the facet in the context of the search results that have already been returned. In an example, the adding includes query the facets as calculated in a batch process. In an example, the context includes identification of an entity. In an example, a facet in the context dependent facet set is an affiliation between a result in the search results and the entity. The affiliation may be any measureable interaction between the entity and the search result. Thus, for example if a vehicle record 135 includes a "make" attribute, and that make of vehicle is produced by an entity, there is an affiliation between the entity and the vehicle record 135. This affiliation, when measured, may be added to a context dependent facet set of the record and indexed using the entity.

In an example, the search result identifies a person. Here, the affiliation is a record of activity by the person with respect to the entity. In an example, the record of activity includes a selection by the person to follow the entity in a social media platform (e.g., service). In an example, the record of activity includes a search for the entity by the person. In an example, the record of activity includes a connection between the person and another person who is at the entity. In an example, the connection is only considered when established in the social media platform under the direction of the person. This is common when, for example, the person elects to follow, subscribe, or otherwise overtly affiliate with the entity. In an example, the record of activity includes a previous application of employment at the entity.

In an example, the context includes a user who performed a search resulting in the search results (e.g., the user). Here, the facet in the context dependent facet set is an action taken by the user with respect to the result in the past. In the example of a recruiter, such action may include such things as communicating with the candidate, recommending that the candidate be hired, saving the candidate as a potential hire, or even viewing the candidate's profile for a significant period of time or a significant number of times. The significance of these last metrics may be measured, for example, by comparing the amount of time users generally, or this use in particular spend on a particular profile to general a statistical distribution of observations times. When the particular viewing of a profile, in either time or frequency, is beyond a threshold (e.g., above the mean, median, one or more standard deviations above the mean, etc.) it is considered significant.

In an example, the context includes an entity position previously provided as a query parameter to produce the search results. Here, the facet in the context dependent facet set is a time-in-position metric. In an example, the time-in-position metric is a statistical characterization of the result in a group. In an example, the group is the entire search results. In an example, the time-in-position metric is a segment identification. These classifications provide, for example, a view into the stability of a candidate. Thus, a person with a below average, or other statistical measure, of time in previous positions may signify that this candidate is unlikely to stay at a new position. This may also recommend a candidate as they may be more likely to leave a current employer. By comparing the candidate's activity with respect to positions and other candidates in a similar situation (as governed by the search parameters resulting in the search results), additional insight into the suitability of approaching a candidate may be had.

The user interface module is arranged to present a user interface of the context dependent facet set in conjunction with displaying the search results. The user interface module may display the search results in the search result area 110, a traditional facet interface in the side rail 115 and the user interface in the top rail 105. An examples of the user interface are illustrated in FIGS. 3 through 5B. In an example, the user interface of the context dependent facet set includes, for each facet in the context dependent facet set, a label for the facet and a count of the search results to which the facet applied.

In an example, the user interface displays members of the context dependent facet set in a linear element. In an example, the members of the context dependent facet set that are displayed in an order initially established by a value of each facet. In an example, the value is the count of the search results. In an example, the user interface module is arranged to reordering the order of the facets to place the facet at an end of the linear element.

The user interface module is arranged to receive a selection of a facet in the context dependent facet set from a user and to filter the search results being displayed, the filtering including search results that meet a measurement of the facet and excluding the remaining search results. Here, meeting a measurement of the facet is accomplished when an attribute of the record satisfies a condition of the facet. For example, if the facet is a location of Hollywood Calif., the record meets the facet measurement if the record includes a Hollywood Calif. location. However, If the facet is "within 100 miles of Hollywood Calif.," only records within this radius meet the measurement. The conditional, or range based, definition of the facet defines the yardstick by which records are evaluated (e.g., measured) to determine whether the facet applies.

Facets that are dependent on a search context enhance the current use of facets that are generally derived from the search result records themselves. Because different searching tasks are likely to benefit from different search sensitive facets, the system 125 provides a better experience to the user, resulting in more effective searching.

Figure 2:
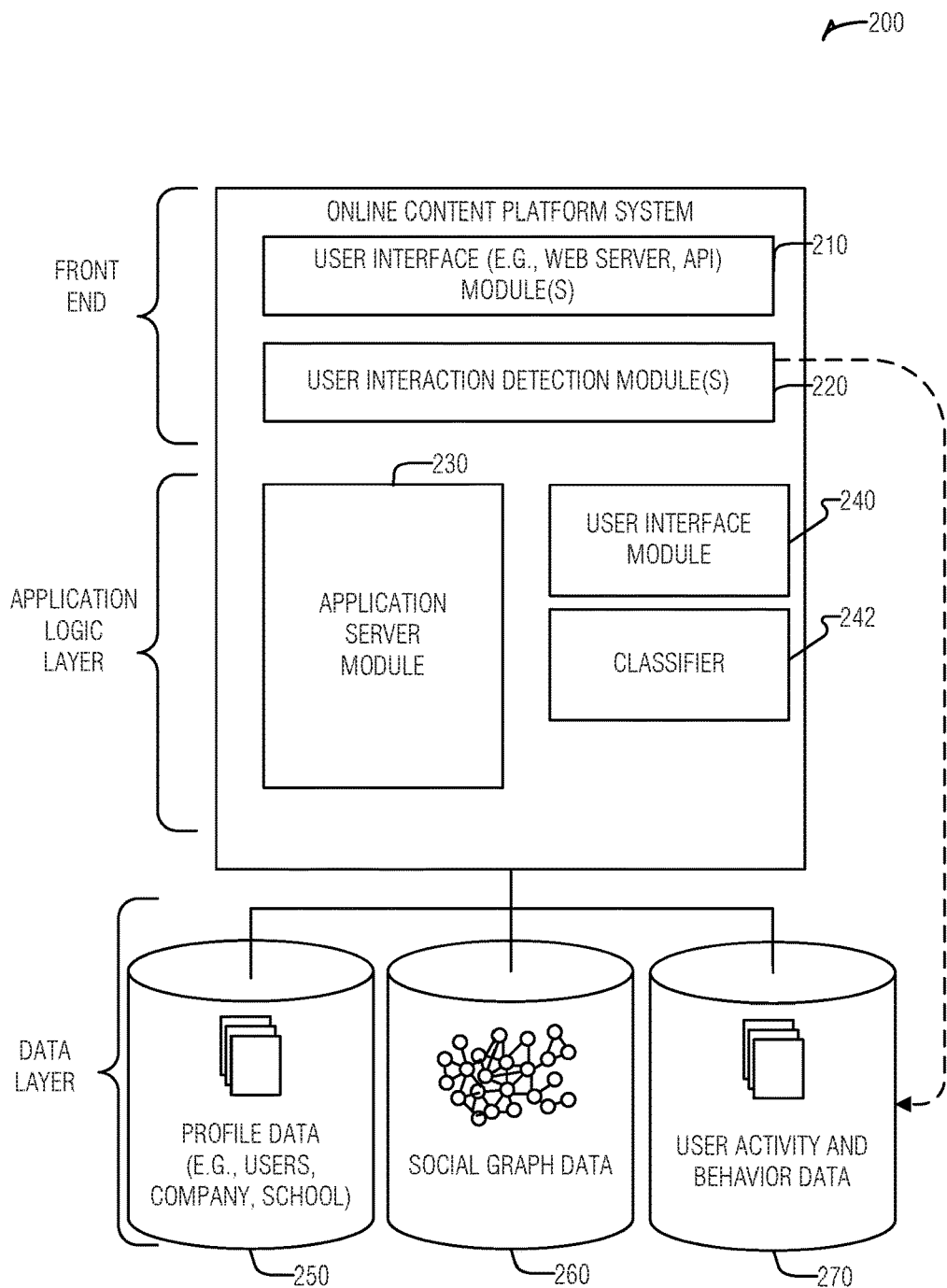
FIG. 2 illustrates the functional components of a social networking service, according to an embodiment.

FIG. 2 illustrates the functional components of a social networking service 200, according to an embodiment. A front end module may comprise a user interface module (e.g., a web server) 220, which receives requests from various client-computing devices, and communicates appropriate responses to the requesting client devices. For example, the user interface module(s) 210 may receive requests in the form of Hypertext Transport Protocol (HTTP) requests, or other network-based, application programming interface (API) requests (e.g., from a dedicated social networking service application running on a client device). In addition, a user interaction and detection module 220 may be provided to detect various interactions that users (e.g., members) have with different applications, services and content presented. Upon detecting a particular interaction, the user interaction and detection module 220 logs the interaction, including the type of interaction and any metadata relating to the interaction, in the member activity and behavior database 270.

An application logic layer may include one or more various application server modules 230, which, in conjunction with the user interface module(s) 210, generate various graphical user interfaces (e.g., web pages) with data retrieved from various data sources in the data layer. With some embodiments, application server module 230 is used to implement the functionality associated with various applications and/or services provided by the social networking service as discussed above.

Application logic layer may also include the user interface module 240 and a classifier 242. As discussed in FIG. 1, these components facilitate facet expansion.

A data layer may include several databases, such as a database 250 for storing profile data, including both member profile data as well as profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 250. Similarly, when a representative of an organization initially registers the organization with the social networking service, the representative may be prompted to provide certain information about the organization. This information may be stored, for example, in the database 250, or another database (not shown). With some embodiments, the profile data may be processed (e.g., in the background or offline) to generate various derived profile data. For example, if a member has provided information about various job titles the member has held with the same company or different companies, and for how long, this information can be used to inter or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Information describing the various associations and relationships, such as connections that the members establish with other members, or with other entities and objects, is stored and maintained within a social graph in the social graph database 260. Also, as members interact with the various applications, services, and content made available via the social networking service, the members' interactions and behavior (e.g., content viewed, links or buttons selected, messages responded to, etc.) may be tracked and information concerning the member's activities and behavior may be logged or stored, for example, by the member activity and behavior database 270.

With some embodiments, the social networking service 200 provides an application programming interface (API) module with the user interface module 210 via which applications and services can access various data and services provided or maintained by the social networking service. For example, using an API, an application may be able to request and/or receive one or more navigation recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Figure 3:
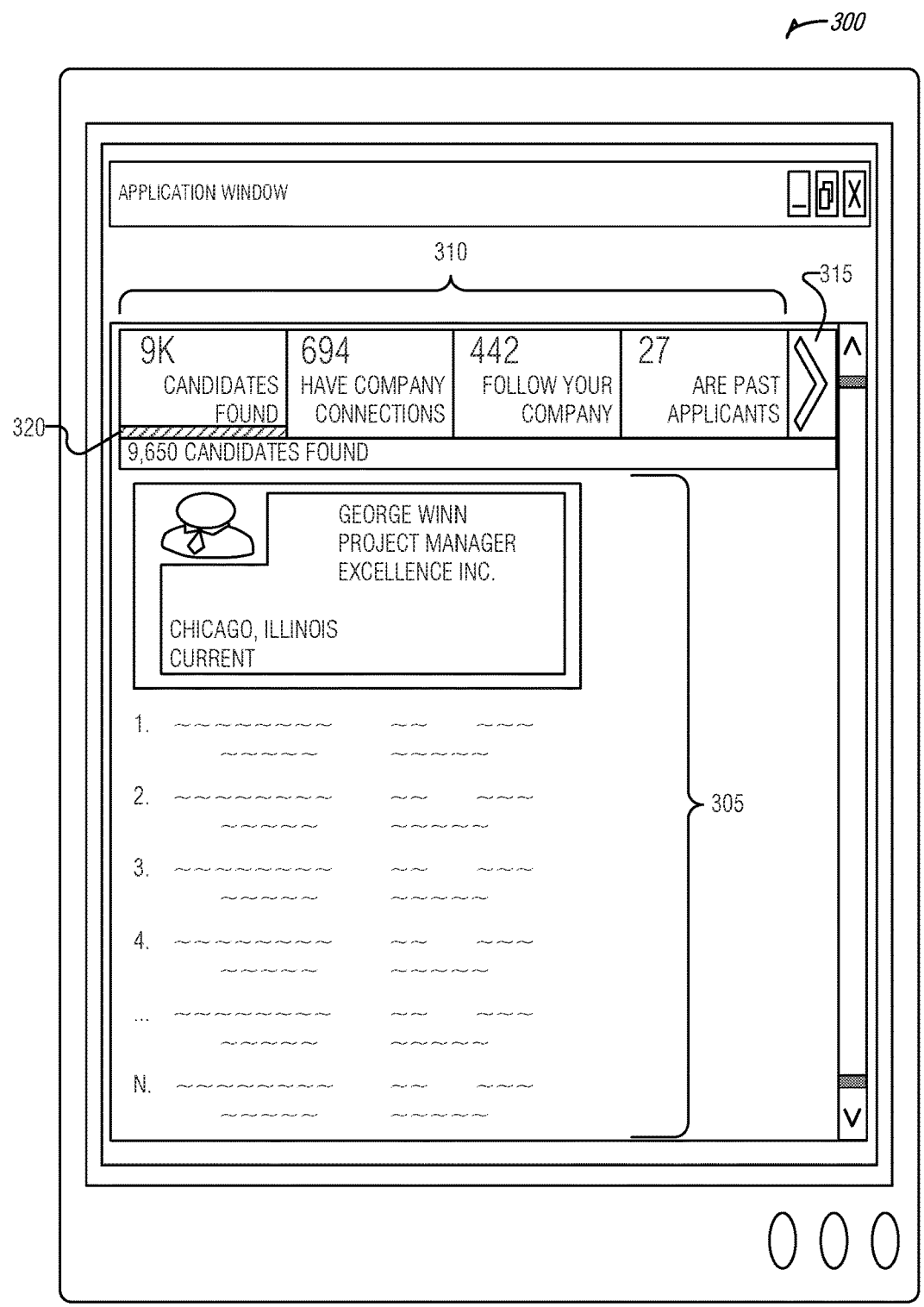
FIGS. 3-5B illustrate examples of user interface elements for search result refinement, according to an embodiment.

FIGS. 3-5B illustrate examples of user interface elements for search result refinement, according to an embodiment. FIG. 3 illustrates an interface 300 presented in a search application where search results are displayed in an area 305 below the context dependent facet set 310. FIG. 3 illustrates a constrained linear area in which facets are displayed with an overflow access element 315 to allow the user to expand the context dependent facet set. Also illustrated is a graphical marker 320 indicating which context dependent facet is currently selected. In an example, only one context dependent facet may be selected at a time.

Figure 4:
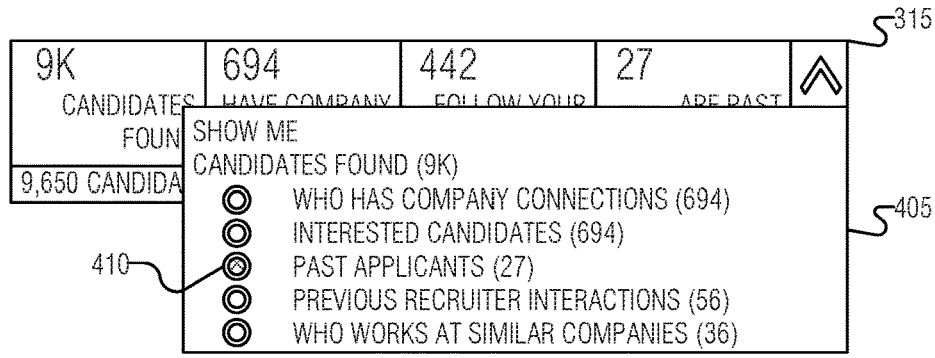

FIG. 4 illustrates the result of activating the overflow access element 315. A menu 405 is presented in which a radio button type selection element 410 is used to select a corresponding facet. In an example, where multiple facets may be selected, a check box like element may replace the radio button for the select element 410.

Figure 5A:
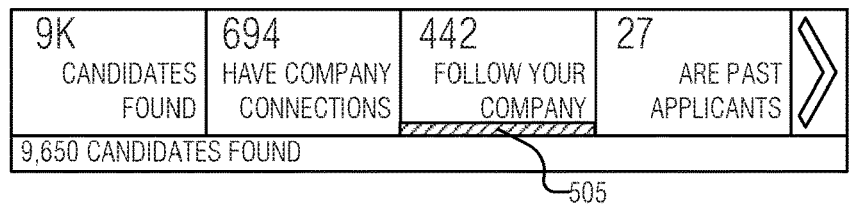
Figure 5B:
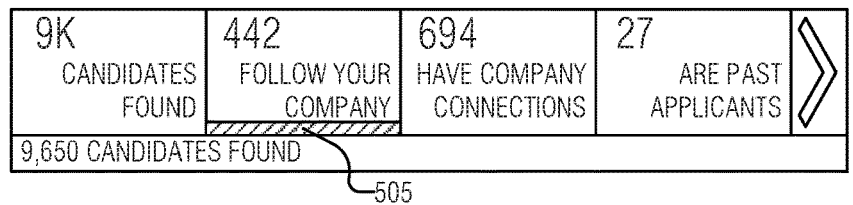

FIGS. 5A and 5B illustrate the reordering of the search context dependent facets after a facet is selected. Specifically, in FIG. 5A the facets are given a natural ordering, such as the number of records in the search results that the facet encompasses. The "FOLLOW YOUR COMPANY" facet 505 is selected, initially in the third position (the first position being here occupied by a total result indicator rather than a facet). After the selection is made, FIG. 5B, the linear ordering of the facets is rearranged such that the selected facet 505 takes a more prominent position, here being moved to the left-most position.

Figure 6:
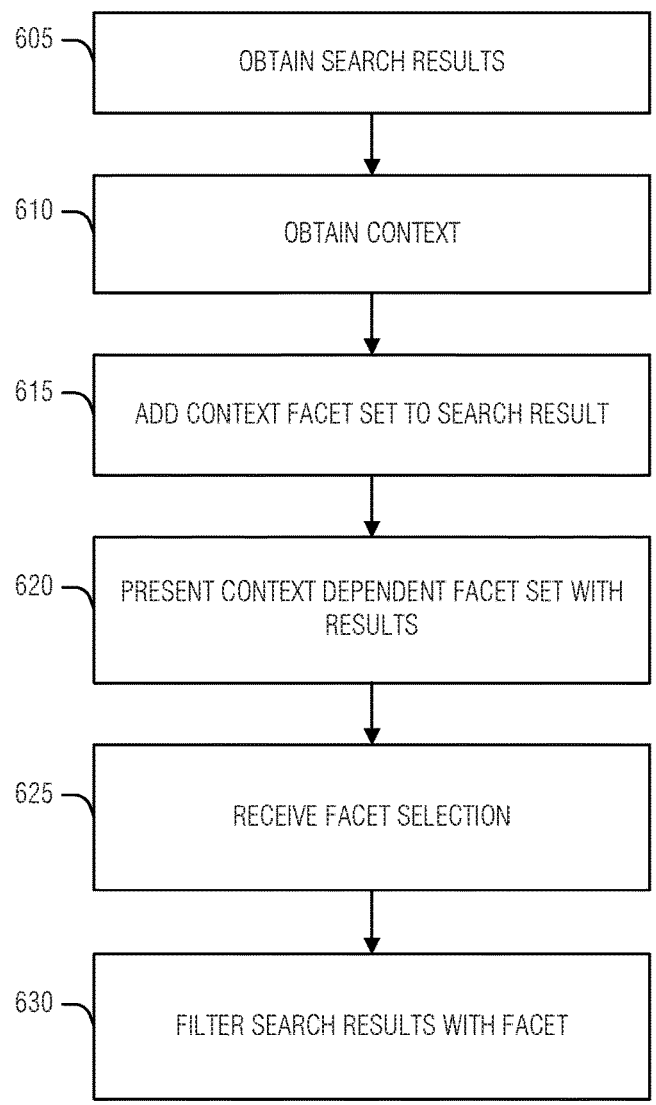
FIG. 6 illustrates an example of a method for search result refinement, according to an embodiment.

FIG. 6 illustrates an example of a method 600 for search result refinement, according to an embodiment. Operations of the method 600 are preformed using computer hardware, such as processors, memory, or circuitry, as described below with respect to FIG. 7.

At operation 605, search results are obtained.

At operation 610, a search context (e.g., context) is obtained.

At operation 615, a context dependent facet set is added to a search result in the search results. In an example the context includes identification of an entity. In an example a facet in the context dependent facet set is an affiliation between a result in the search results and the entity.

In an example the search result identifies a person. Here, the affiliation is a record of activity by the person with respect to the entity. In an example the record of activity includes a selection by the person to follow the entity in a social media platform. In an example the record of activity includes a search for the entity by the person. In an example the record of activity includes a connection between the person and another person who is at the entity. In an example the connection is established in a social media platform under the direction of the person. In an example the record of activity includes a previous application of employment at the entity.

In an example the context includes a user who performed a search resulting in the search results. Here, a facet in the context dependent facet set is an action taken by the user with respect to the result in the past.

In an example the context includes an entity position previously provided as a query parameter to produce the search results. Here, a facet in the context dependent facet set is a time-in-position metric. In an example the time-in-position metric is a statistical characterization of the result in a group. In an example the group is the entire search results. In an example the time-in-position metric is a segment identification.

At operation 620, a user interface of the context dependent facet set is presented in conjunction with displaying the search results. In an example the user interface of the context dependent facet set includes, for each facet in the context dependent facet set, a label for the facet and a count of the search results to which the facet applied.

In an example the user interface displays members of the context dependent facet set in a linear element. In an example the members of the context dependent facet set that are displayed in an order initially established by a value of each facet. In an example the value is the count of the search results. In an example, the method 600 is optionally extended to include reordering the order to place the facet at an end of the linear element.

At operation 625, a selection of a facet in the context dependent facet set is received from a user.

At operation 630, the search results being displayed are filtered. In an example the filtering includes search results that meet a measurement of the facet and excludes the remaining search results.

Figure 7:
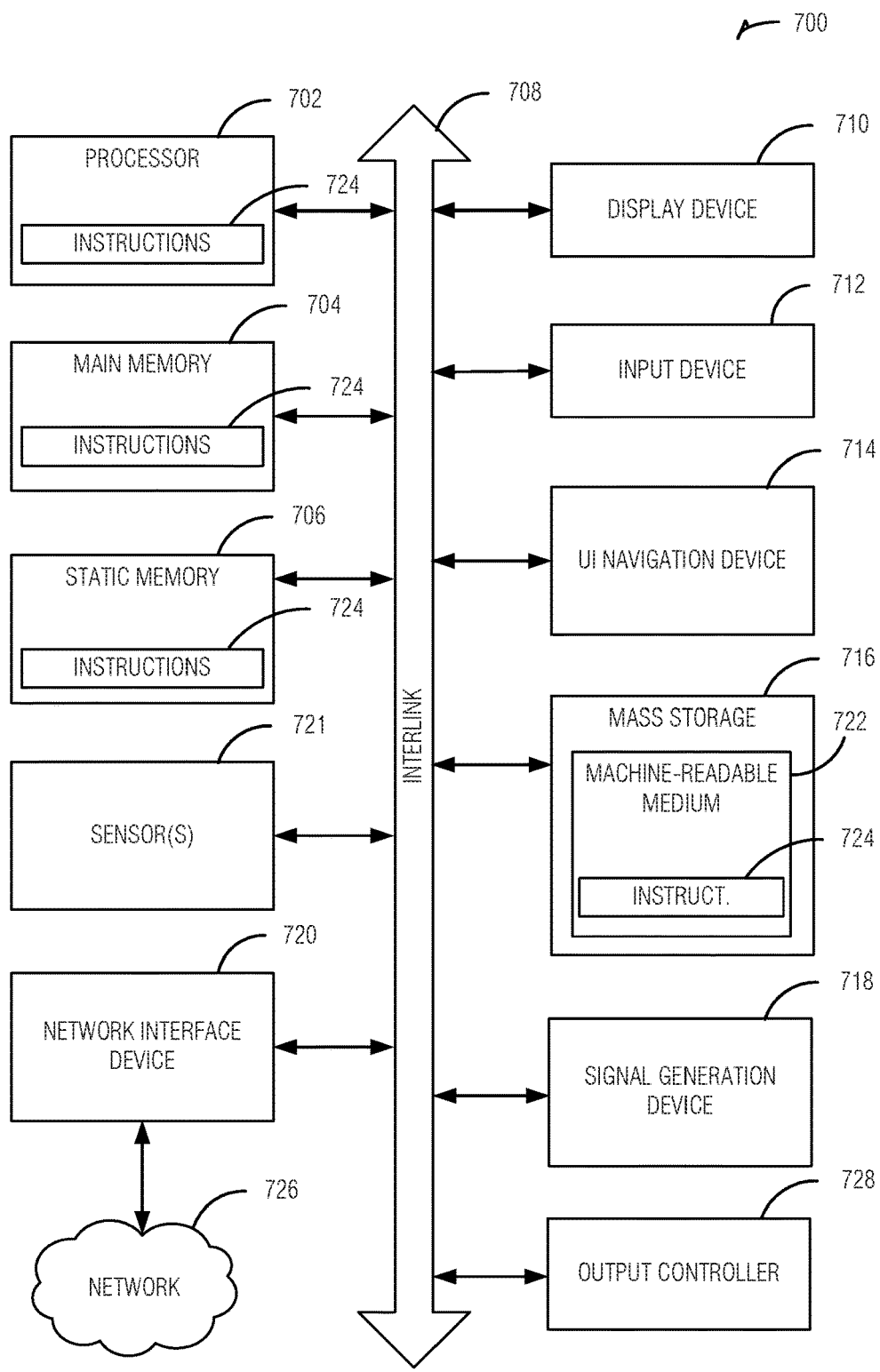
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein, The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., institute of Electrical and Electronics Engineers (IEEE) 802.11 family of standards known as Wi-Fi®, IEEE 802.16 family of standards known as WiMAX®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

ADDITIONAL NOTES & EXAMPLES

Example 1 is a system for search result refinement, the system comprising: a processor; and a memory including instructions that, when executed by the processor, cause the processor to: obtain search results; obtain a search context; add a context dependent facet set to a search result in the search results; present a user interface of the context dependent facet set in conjunction with displaying the search results; receive a selection of a facet in the context dependent facet set from a user; and filter the search results being displayed, the filtering including search results that meet a measurement of the facet and excluding the remaining search results.

In Example 2, the subject matter of Example 1 optionally includes wherein the user interface of the context dependent facet set includes, for each facet in the context dependent facet set, a label for the facet and a count of the search results to which the facet applied.

In Example 3, the subject matter of Example 2 optionally includes wherein the user interface displays members of the context dependent facet set in a linear element.

In Example 4, the subject matter of Example 3 optionally includes wherein the members of the context dependent facet set that are displayed in an order initially established by a value of each facet.

In Example 5, the subject matter of Example 4 optionally includes wherein the value is the count of the search results.

In Example 6, the subject matter of any one or more of Examples 4-5 optionally include wherein the instructions further cause the processor to reorder the order to place the facet at an end of the linear element.

in Example 7, the subject matter of any one or more of Examples 1-6 optionally include wherein the context includes identification of an entity.

in Example 8, the subject matter of Example 7 optionally includes wherein a facet in the context dependent facet set is an affiliation between a result in the search results and the entity.

In Example 9, the subject matter of Example 8 optionally includes wherein the search result identifies a person, and wherein the affiliation is a record of activity by the person with respect to the entity.

In Example 10, the subject matter of Example 9 optionally includes wherein the record of activity includes a selection by the person to follow the entity in a social media platform.

in Example 11, the subject matter of any one or more of Example 9-10 optionally include wherein the record of activity includes a search for the entity by the person.

In Example 12, the subject matter of any one or more of Examples 9-11 optionally include wherein the record of activity includes a connection between the person and another person who is at the entity, the connection established in a social media platform under the direction of the person.

In Example 13, the subject matter of any one or more of Examples 9-12 optionally include wherein the record of activity includes a previous application of employment at the entity.

In Example 14, the subject matter of any one or more of Examples 1-13 optionally include wherein the context includes a user who performed a search resulting in the search results, and wherein a facet in the context dependent facet set is an action taken by the user with respect to the result in the past.

In Example 15, the subject matter of any one or more of Examples 1-14 optionally include wherein the context includes an entity position previously provided as a query parameter to produce the search results, and wherein a facet in the context dependent facet set is a time-in-position metric.

in Example 16, the subject matter of Example 15 optionally includes wherein the time-in-position metric is a statistical characterization of the result in a group.

In Example 17, the subject matter of Example 16 optionally includes wherein the group is the entire search results.

In Example 18, the subject matter of any one or more of Examples 16-17 optionally include wherein the time-in-position metric is a segment identification.

Example 19 is a method for search result refinement, the method comprising: obtaining search results; obtaining a search context; adding a context dependent facet set to a search result in the search results; presenting a user interface of the context dependent facet set in conjunction with displaying the search results; receiving a selection of a facet in the context dependent facet set from a user; and filtering the search results being displayed, the filtering including search results that meet a measurement of the facet and excluding the remaining search results.

In Example 20, the subject matter of Example 19 optionally includes wherein the user interface of the context dependent facet set includes, for each facet in the context dependent facet set, a label for the facet and a count of the search results to which the facet applied.

In Example 21, the subject matter of Example 20 optionally includes wherein the user interface displays members of the context dependent facet set in a linear element.

In Example 22, the subject matter of Example 21 optionally includes wherein the members of the context dependent facet set that are displayed in an order initially established by a value of each facet.

In Example 23, the subject matter of Example 22 optionally includes wherein the value is the count of the search results.

In Example 24, the subject matter of any one or more of Examples 22-23 optionally include reordering the order to place the facet at an end of the linear element.

In Example 25, the subject matter of any one or more of Examples 19-24 optionally include wherein the context includes identification of an entity.

In Example 26, the subject matter of Example 25 optionally includes wherein a facet in the context dependent facet set is an affiliation between a result in the search results and the entity.

In Example 27, the subject matter of Example 26 optionally includes wherein the search result identifies a person, and wherein the affiliation is a record of activity by the person with respect to the entity.

In Example 28, the subject matter of Example 27 optionally includes wherein the record of activity includes a selection by the person to follow the entity in a social media platform.

In Example 29, the subject matter of any one or more of Examples 27-28 optionally include wherein the record of activity includes a search for the entity by the person.

In Example 30, the subject matter of any one or more of Examples 27-29 optionally include wherein the record of activity includes a connection between the person and another person who is at the entity, the connection established in a social media platform under the direction of the person.

In Example 31, the subject matter of any one or more of Examples 27-30 optionally include wherein the record of activity includes a previous application of employment at the entity.

In Example 32, the subject matter of any one or more of Examples 19-31 optionally include wherein the context includes a user who performed a search resulting in the search results, and wherein a facet in the context dependent facet set is an action taken by the user with respect to the result in the past.

In Example 33, the subject matter of any one or more of Examples 19-32 optionally include wherein the context includes an entity position previously provided as a query parameter to produce the search results, and wherein a facet in the context dependent facet set is a time-in-position metric.

In Example 34, the subject matter of Example 33 optionally includes wherein the time-in-position metric is a statistical characterization of the result in a group.

In Example 35, the subject matter of Example 34 optionally includes wherein the group is the entire search results.

In Example 36, the subject matter of any one or more of Examples 34-35 optionally include wherein the time-in-position metric is a segment identification.

Example 37 is a machine readable medium including instructions that, when executed by the machine, cause the machine to: obtain search results; obtain a search context; add a context dependent facet set to a search result in the search results; present a user interface of the context dependent facet set in conjunction with displaying the search results; receive a selection of a facet in the context dependent facet set from a user; and filter the search results being displayed, the filtering including search results that meet a measurement of the facet and excluding the remaining search results.

In Example 38, the subject matter of Example 37 optionally includes wherein the user interface of the context dependent facet set includes, for each facet in the context dependent facet set, a label for the facet and a count of the search results to which the facet applied.

In Example 39, the subject matter of Example 38 optionally includes wherein the user interface displays members of the context dependent facet set in a linear element.

In Example 40, the subject matter of Example 39 optionally includes wherein the members of the context dependent facet set that are displayed in an order initially established by a value of each facet.

In Example 41, the subject matter of Example 40 optionally includes wherein the value is the count of the search results.

In Example 42, the subject matter of any one or more of Examples 40-41 optionally include wherein the instructions further cause the processor to reorder the order to place the facet at an end of the linear element.

In Example 43, the subject matter of any one or more of Examples 37-42 optionally include wherein the context includes identification of an entity.

In Example 44, the subject matter of Example 43 optionally includes wherein a facet in the context dependent facet set is an affiliation between a result in the search results and the entity.

In Example 45, the subject matter of Example 44 optionally includes wherein the search result identifies a person, and wherein the affiliation is a record of activity by the person with respect to the entity.

In Example 46, the subject matter of Example 45 optionally includes wherein the record of activity includes a selection by the person to follow the entity in a social media platform.

In Example 47, the subject matter of any one or more of Examples 45-46 optionally include wherein the record of activity includes a search for the entity by the person.

In Example 48, the subject matter of any one or more of Examples 45-47 optionally include wherein the record of activity includes a connection between the person and another person who is at the entity, the connection established in a social media platform under the direction of the person.

In Example 49, the subject matter of any one or more of Examples 45-48 optionally include wherein the record of activity includes a previous application of employment at the entity.

In Example 50, the subject matter of any one or more of Examples 37-49 optionally include wherein the context includes a user who performed a search resulting in the search results, and wherein a facet in the context dependent facet set is an action taken by the user with respect to the result in the past.

In Example 51, the subject matter of any one or more of Examples 37-50 optionally include wherein the context includes an entity position previously provided as a query parameter to produce the search results, and wherein a facet in the context dependent facet set is a time-in-position metric.

In Example 52, the subject matter of Example 51 optionally includes wherein the time-in-position metric is a statistical characterization of the result in a group.

In Example 53, the subject matter of Example 52 optionally includes wherein the group is the entire search results.

In Example 54, the subject matter of any one or more of Examples 52-53 optionally include wherein the time-in-position metric is a segment identification.

Example 55 is a method comprising: categorizing search result entities; presenting a subset of the categories along with the search results in a display; receiving a user entry selecting a category; and filtering the search results in response to the category selection.

In Example 56, the subject matter of Example 55 optionally includes wherein the subset of categories are ordered.

In Example 57, the subject matter of Example 56 optionally includes wherein the order of the categories is determined by effectiveness for an identified search.

In Example 58, the subject matter of any one or more of Examples 55-57 optionally include wherein the search result entities represent people who are job candidates.

In Example 59, the subject matter of Example 58 optionally includes wherein the categories include at least one of connections to a target company, follow the target company, are past applicants to the target company, have previous interactions with a recruiter, or works at a similar company to a target company.

In Example 60, the subject matter of any one or more of Examples 55-59 optionally include wherein category selection is limited to a single category at a time.

Example 61 is a system comprising: a classifier to categorize search result entities; and a user interface to: present a subset of the categories along with the search results in a display; receiving a user entry selecting a category; and filtering the search results in response to the category selection.

in Example 62, the subject matter of Example 61 optionally includes wherein the subset of categories are ordered.

In Example 63, the subject matter of Example 62 optionally includes wherein the order of the categories is determined by effectiveness for an identified search.

In Example 64, the subject matter of any one or more of Examples 61-63 optionally include wherein the search result entities represent people who are job candidates.

In Example 65, the subject matter of Example 64 optionally includes wherein the categories include at least one of connections to a target company, follow the target company, are past applicants to the target company, have previous interactions with a recruiter, or works at a similar company to a target company.

In Example 66, the subject matter of any one or more of Examples 61-65 optionally include wherein category selection is limited to a single category at a time.

The above detailed description includes references to the accompanying drawings, which form apart of the detailed description. The drawings show, by way of illustration, specific embodiments that may be practiced These embodiments are also referred to herein as "examples," Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for search result refinement, the system comprising:
  a processor; and
  a memory including instructions that, when executed by the processor, cause the processor to:
    obtain search results for a search;
    obtain a search context for the search, the search context including information identifying a person performing the search or information identifying an organization on behalf of which the search is being performed;
    add a context dependent facet set to a search result in the search results, wherein the facet in the context dependent facet set is an affiliation between a result in the search results and a person performing the search or the organization on behalf of which the search is being performed;

present a user interface of the context dependent facet set in conjunction with displaying the search results;

receive a selection of a facet in the context dependent facet set from a user; and filter the search results being displayed, the filtering including search results that meet a measurement of the facet and excluding the remaining search results.

2. The system of claim 1, wherein the user interface of the context dependent facet set includes, for each facet in the context dependent facet set, a label for the facet and a count of the search results to which the facet applied.

3. The system of claim 2, wherein the user interface displays members of the context dependent facet set in a linear element.

4. The system of claim 3, wherein the members of the context dependent facet set are displayed in an order initially established by a value of each facet.

5. The system of claim 1, wherein a search result in the search results identifies a person, and wherein the affiliation is a record of activity indicating the person previously applied for a job at the organization on behalf of which the search has been performed.

6. The system of claim 1, wherein a search result in the search results identifies a person, and wherein the affiliation is a record of activity indicating the person is a follower of the organization on behalf of which the search has been performed.

7. The system of claim 1, wherein a search result in the search results identifies a person, and wherein the affiliation is a record of activity indicating the person has previously searched for the organization on behalf of which the search has been performed.

8. A method for search result refinement, the method comprising:

obtaining search results for a search;

obtaining a search context for the search, the search context including information identifying a person performing the search or information identifying an organization on behalf of which the search is being performed;

adding a context dependent facet set to a search result in the search results, wherein the facet in the context dependent facet set is an affiliation between a result in the search results and the person performing the search or the organization on behalf of which the search is being performed;

presenting a user interface of the context dependent facet set in conjunction with displaying the search results;

receiving a selection of a facet in the context dependent facet set from a user; and filtering the search results being displayed, the filtering including search results that meet a measurement of the facet and excluding the remaining search results.

9. The method of claim 8, wherein the user interface of the context dependent facet set includes, for each facet in the context dependent facet set, a label for the facet and a count of the search results to which the facet applied.

10. The method of claim 9, wherein the user interface displays members of the context dependent facet set in a linear element.

11. The method of claim 10, wherein the members of the context dependent facet set are displayed in an order initially established by a value of each facet.

12. The method of claim 8, wherein a search result in the search results identifies a person, and wherein the affiliation is a record of activity indicating the person previously applied for a job at the organization on behalf of which the search has been performed.

13. The method of claim 8, wherein a search result in the search results identifies a person, and wherein the affiliation is a record of activity indicating the person is a follower of the organization on behalf of which the search has been performed.

14. The method of claim 8, wherein a search result in the search results identifies a person, and wherein the affiliation is a record of activity indicating the person has previously searched for the organization on behalf of which the search has been performed.

15. A machine readable medium including instructions that, when executed by the machine, cause the machine to:

obtain search results for a search;

obtain a search context for the search, the search context including information identifying a person performing the search or information identifying an organization on behalf of which the search is being performed;

add a context dependent facet set to a search result in the search results, wherein the facet in the context dependent facet set is an affiliation between a result in the search results and the person performing the search or the organization on behalf of which the search is being performed;

present a user interface of the context dependent facet set in conjunction with displaying the search results;

receive a selection of a facet in the context dependent facet set from a user; and filter the search results being displayed, the filtering including search results that meet a measurement of the facet and excluding the remaining search results.

16. The machine readable medium of claim 15, wherein the user interface of the context dependent facet set includes, for each facet in the context dependent facet set, a label for the facet and a count of the search results to which the facet applied.

17. The machine readable medium of claim 16, wherein the user interface displays members of the context dependent facet set in a linear element.

18. The machine readable medium of claim 17, wherein the members of the context dependent facet set are displayed in an order initially established by a value of each facet.

19. The machine readable medium of claim 15, wherein a search result in the search results identifies a person, and wherein the affiliation is a record of activity indicating the person previously applied for a job at the organization on behalf of which the search has been performed.

20. The machine readable medium of claim 15, wherein a search result in the search results identifies a person, and wherein the affiliation is a record of activity indicating the person is a follower of the organization on behalf of which the search has been performed.

21. The machine readable medium of claim 15, wherein a search result in the search results identifies a person, and wherein the affiliation is a record of activity indicating the person has previously searched for the organization on behalf of which the search has been performed.

* * * * *